April 19, 1927.
R. AMODIO
1,625,014
HEAT INDICATOR FOR HEATED TOOLS
Filed April 15, 1925
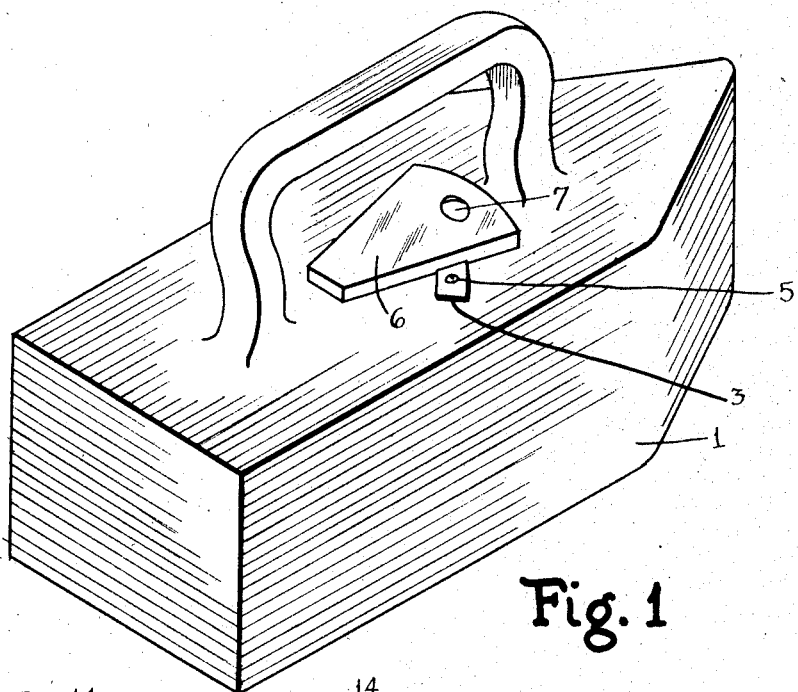
Fig. 1
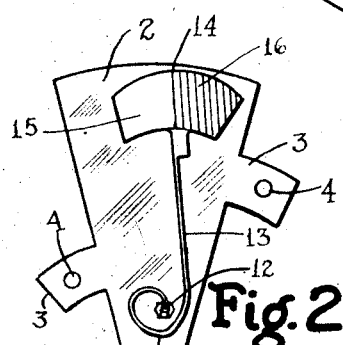
Fig. 2
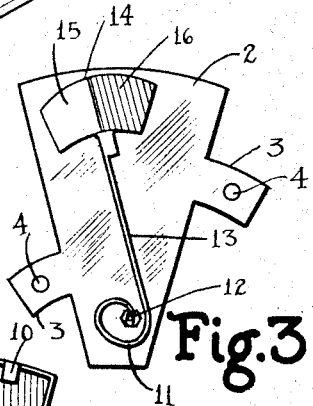
Fig. 3
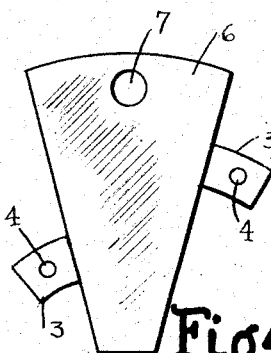
Fig. 4
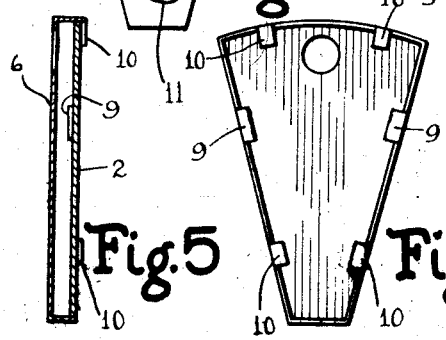
Fig. 5  Fig. 6
INVENTOR.
Robert Amodio
BY 
HIS ATTORNEYS.

Patented Apr. 19, 1927.

1,625,014

UNITED STATES PATENT OFFICE.

ROBERT AMODIO, OF ROCHESTER, NEW YORK, ASSIGNOR OF ONE-HALF TO HARRY C. D'ANNUNZIO, OF ROCHESTER, NEW YORK.

HEAT INDICATOR FOR HEATED TOOLS.

Application filed April 15, 1925. Serial No. 23,394.

The present invention relates to a heat indicator for heated tools and an object of the invention is to provide a construction which will be effective in use and inexpensive to manufacture. A further object of the invention is to provide an automatic indicator which may be attached to a pressing iron and will have a minimum number of parts.

To these and other ends, the invention consists of certain parts and combinations of parts, all of which will be hereinafter described; the novel features being pointed out in the appended claim.

In the drawings:

Fig. 1 is a perspective view of the pressing iron with the indicator attached thereto;

Fig. 2 is a view of the indicator with the top casing member removed, showing the indicating device in normal position;

Fig. 3 is a similar view showing the indicating device shifted under the action of the heat;

Fig. 4 is a plan view of the indicator;

Fig. 5 is a sectional view of the indicator with the indicating device removed; and Fig. 6 is a rear view of the top casing member.

Referring more particularly to the drawings, 1 indicates a pressing iron to the top surface of which the automatic indicator is secured. In the illustrated embodiment, this indicator comprises a bottom plate 2 formed from sheet metal and having lips 3 extending therefrom and provided with openings 4 through which bolts or other fasteners 5 may be passed to secure the indicator to the iron. The other part of the casing embodies a top plate 6 having an opening 7 and side flanges 8 formed with a set of lips 9 against which the bottom plate 2 rests, the bottom plate being held to the lip 9 by bendable lips 10 bent over the bottom plate 2 when the latter has been placed in position on the other part of the casing. Within the casing is arranged a volute expansion member 11 formed of material of high heat conductivity such as copper and having its innermost end riveted at 12 to the bottom plate 2. From the outer end of this volute member an amplifying arm 13 is supported and on the end of this amplifying arm the indicating device 14 is supported, this indicating device, in this instance, being in the form of a plate which will lie under the opening 7 in any position of adjustment of the amplifying arm 13. On this plate a white colored space 15 is provided which lies under the opening 7, when the iron is cooled or not overheated, the plate also having a red colored space 16 which moves under the opening 7 when the iron becomes overheated. The expansion member 11 is so selected, that when the iron is in a normal heated condition, the white space 15 will lie under the opening, but on excess heating the volute portion 1 will expand and produce a turning action, which will swing the amplifying arm 13 laterally and carry the portion 16 on the indicating device under the opening 7, thereby notifying the user of the iron that the latter is excessively hot.

What I claim as my invention and desire to secure by Letters Patent is:

An automatic heat indicator for heated bodies embodying a casing having a side for engagement with the heated body and an opening in its opposite side, a volute thermostatic expansion member having one end secured to the side of the casing engaging the heated body and lying substantially parallel with said side but out of line with the opening, a movement amplifying arm supported by an end of the volute member and extending substantially parallel with that side of the casing arranged for engagement with the heated body, and a plate carried by said arm and extending from opposite sides thereof, said plate having two distinct markings, one of which lies under the opening when the thermostatic device has a temperature below a certain point and the other of which moves under the opening when the temperature of the thermostatic device passes above such certain point.

ROBERT AMODIO.